United States Patent [19]
Toyozawa et al.

[11] Patent Number: 5,646,495
[45] Date of Patent: Jul. 8, 1997

[54] TANDEM CONTROL METHOD BASED ON A DIGITAL SERVOMECHANISM

[75] Inventors: Yukio Toyozawa, Kikuchi-gun; Kazuomi Maeda, Kamoto-gun; Naoto Sonoda, Kamimashiki-gun, all of Japan

[73] Assignee: Fanuc, Ltd., Yamanashi, Japan

[21] Appl. No.: 591,461

[22] PCT Filed: Jun. 6, 1995

[86] PCT No.: PCT/JP95/01116

§ 371 Date: Feb. 6, 1996

§ 102(e) Date: Feb. 6, 1996

[87] PCT Pub. No.: WO96/00934

PCT Pub. Date: Jan. 11, 1996

[30] Foreign Application Priority Data

Jun. 30, 1994 [JP] Japan ..................... 6-170391

[51] Int. Cl.$^6$ ............... G05D 3/12; G05D 3/20
[52] U.S. Cl. ............ 318/625; 318/600; 318/611; 318/630
[58] Field of Search ................. 318/568.22, 569, 318/597, 598, 600, 611, 615, 618, 623, 625, 630, 632, 633

[56] References Cited

U.S. PATENT DOCUMENTS

| | | | |
|---|---|---|---|
| 4,065,074 | 12/1977 | Anderson et al. | 318/6 X |
| 4,289,996 | 9/1981 | Barnes et al. | 318/38 |
| 4,591,772 | 5/1986 | Hollow | 318/632 |
| 4,841,211 | 6/1989 | Neko | 318/569 |
| 4,985,841 | 1/1991 | Iwagaya | 364/474.33 |
| 5,181,441 | 1/1993 | Okada | 82/1.11 |

FOREIGN PATENT DOCUMENTS

| | | |
|---|---|---|
| 57-60211 | 4/1982 | Japan. |
| 59-173534 | 11/1984 | Japan. |
| 62-120514 | 6/1987 | Japan. |
| 63-255705 | 10/1988 | Japan. |
| 4-347709 | 12/1992 | Japan. |

*Primary Examiner*—Bentsu Ro
*Attorney, Agent, or Firm*—Staas & Halsey

[57] ABSTRACT

In the tandem control method designed for driving one axis using a main motor and a sub motor, a speed difference between the main motor and the sub motor is calculated, and a value for correction of torque is obtained based on this speed difference. Then, the value for correction of torque is added to respective torque commands of both the main motor and the sub motor, thereby making it possible to suppress vibrations occurring in the transmission mechanism. Furthermore, the sign of the torque command generated from a speed control section is detected, whereby a positive or negative torque command is suppressed in accordance with its sign, and the current control section of each motor is always supplied with a one-directional torque command whose direction differs from that of the other motor. Thus, it becomes possible to suppress the occurrence of backlash even when a large torque is applied. Furthermore, the position control is performed by the motor corresponding to the position command. Hence, it becomes possible to stabilize the control even in the driving condition where the sub motor is chiefly driven.

9 Claims, 15 Drawing Sheets

FIG. 2(a)
CONTINUOUS SYSTEM → $\dfrac{1 + LS}{1 + \alpha LS}$ →
FIG. 2(b)
DISCRETE SYSTEM → $\dfrac{(1 + 2L/Ts) + (1 - 2L/Ts)Z^{-1}}{(1 + 2\alpha L/Ts) + (1 - 2\alpha L/Ts)Z^{-1}}$ →
FIG. 2(c)
DISCRETE SYSTEM → $\dfrac{N_0 + N_1 \cdot Z^{-1}}{D_0 + D_1 \cdot Z^{-1}}$ →
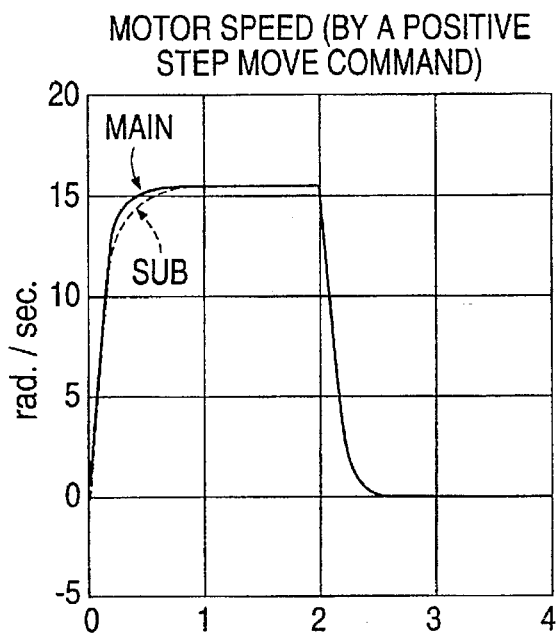
FIG. 5(a)
MOTOR SPEED (BY A POSITIVE STEP MOVE COMMAND)
(WITH DAMPING COMPENSATION, Kc = 0.1)
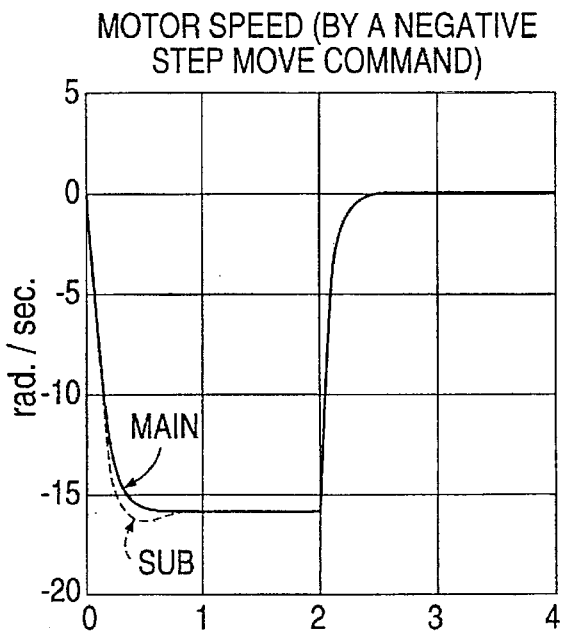
FIG. 5(b)
MOTOR SPEED (BY A NEGATIVE STEP MOVE COMMAND)
(WITH DAMPING COMPENSATION, Kc = 0.1)

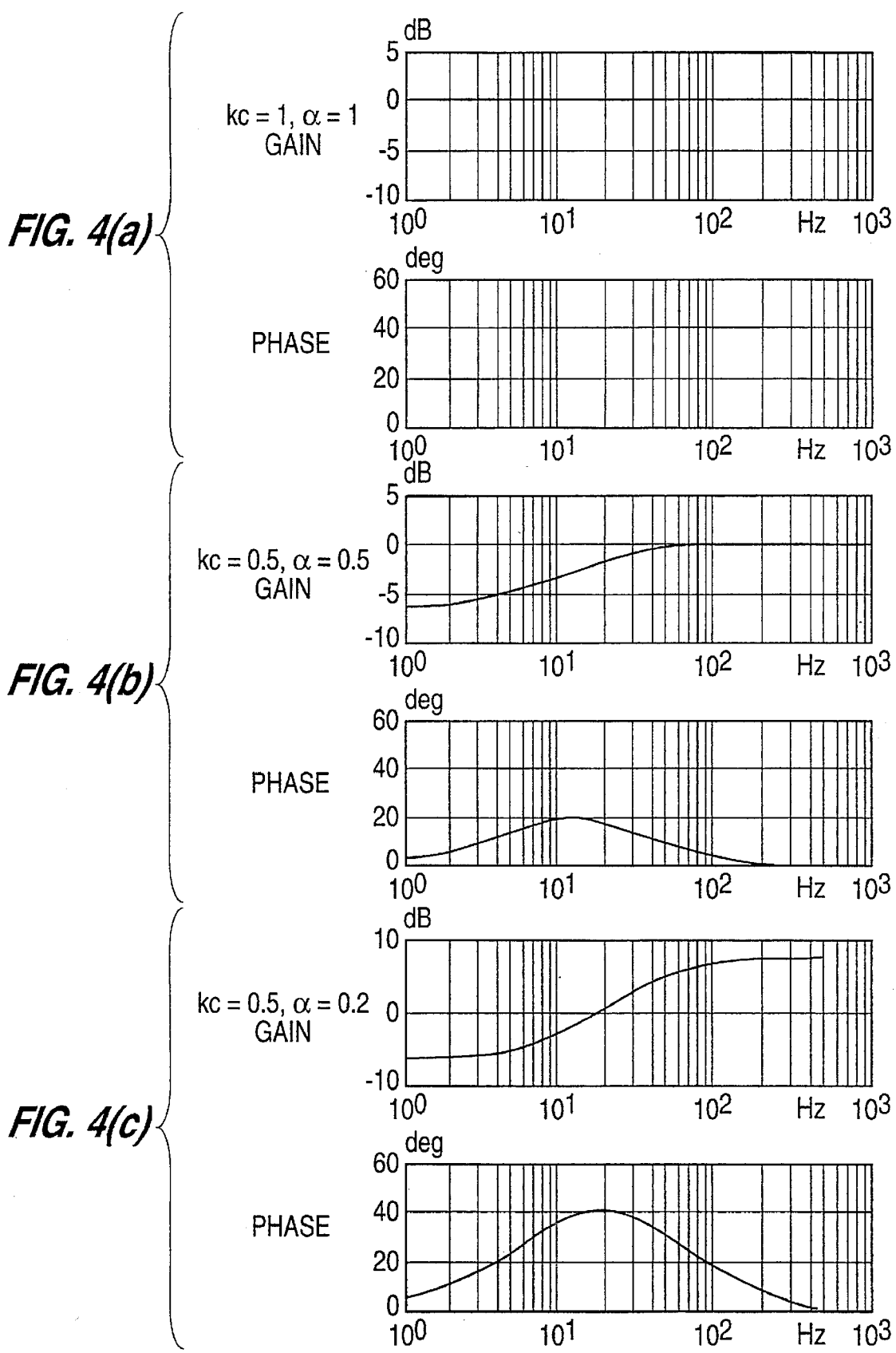

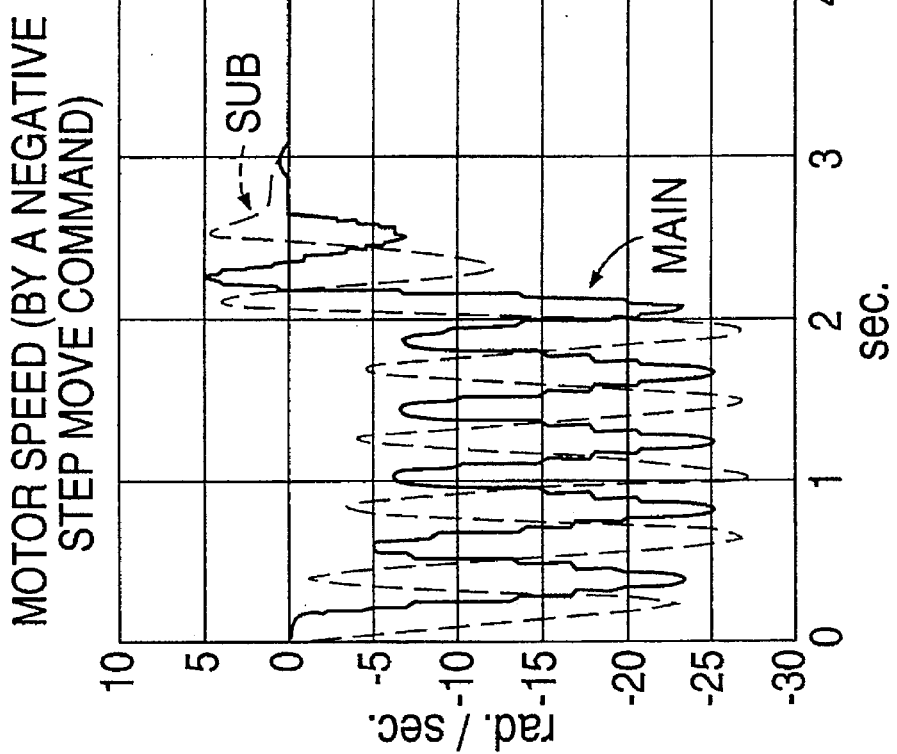
FIG. 9(b) MOTOR SPEED (BY A NEGATIVE STEP MOVE COMMAND)
(WITH SPECIAL CLAMP) (WITHOUT POSITION FEEDBACK SWITCHING)
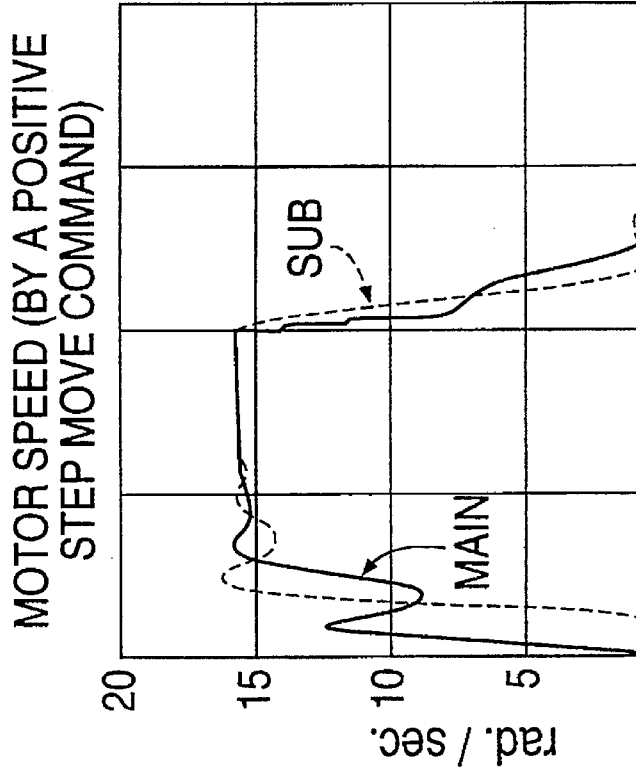
FIG. 9(a) MOTOR SPEED (BY A POSITIVE STEP MOVE COMMAND)
(WITH SPECIAL CLAMP) (WITHOUT POSITION FEEDBACK SWITCHING)

A : DISCRETE TYPE TIME CONSTANT
bn : PRESENT SWITCHING COEFFICIENT
b0 : PREVIOUS SWITCHING COEFFICIENT

MOTOR SPEED (AT A POSITIVE STEP MOVE COMMAND)

(WITH SPECIAL CLAMP)
(WITH POSITION FEEDBACK SWITCHING, TIME CONSTANT: 100ms)
(WITH DAMPING CORRECTION, Kc = 0.02)

MOTOR SPEED (AT A NEGATIVE STEP MOVE COMMAND)

(WITH SPECIAL CLAMP)
(WITH POSITION FEEDBACK SWITCHING, TIME CONSTANT: 100ms)
(WITH DAMPING CORRECTION, Kc = 0.02)

FIG. 15 *PRIOR ART*
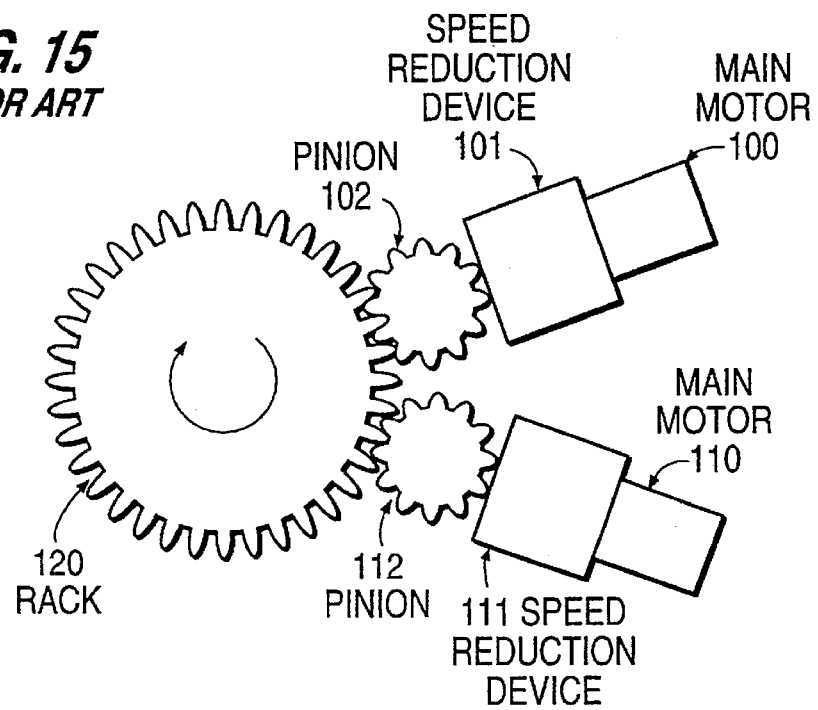
FIG. 16 *PRIOR ART*
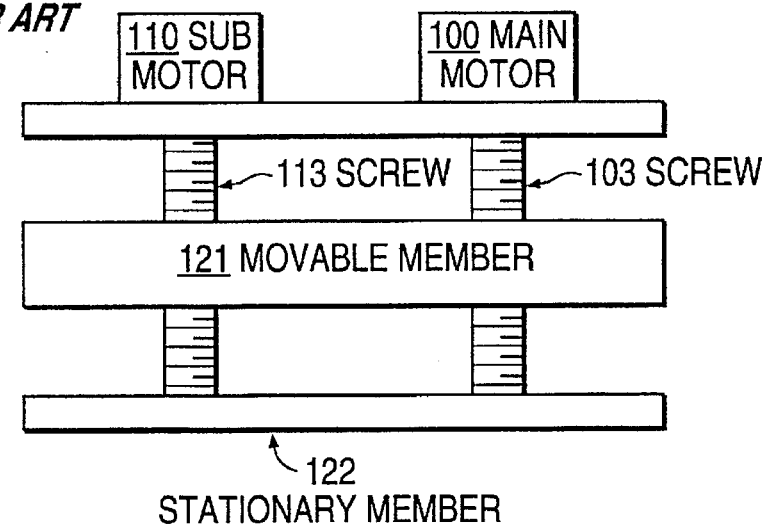
FIG. 17 *PRIOR ART*
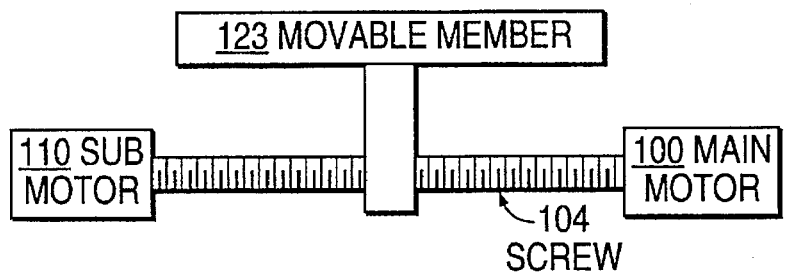

MOTOR SPEED (BY A POSITIVE STEP MOVE COMMAND)
(ACCORDING TO CONVENTIONAL TANDEM CONTROL)

MOTOR SPEED (BY A NEGATIVE STEP MOVE COMMAND)
(ACCORDING TO CONVENTIONAL TANDEM CONTROL)

TANDEM CONTROL METHOD BASED ON A DIGITAL SERVOMECHANISM

TECHNICAL FIELD

This invention relates to a digital servo control for controlling feed shafts of robot arms and machine tools, and more particularly to a tandem control method for controlling a plurality of servo motors to drive a common movable member (i.e. a common axis).

BACKGROUND ART

For a robot or machine tool, sometimes a single drive motor is not good enough to effectively accelerate or decelerate its movable member when such movable member is of large size, or the movable member cannot be moved stably due to the backlash between the motor and the movable member. In such a case, a tandem control is employed, wherein torque commands are given to two motors to control a common shaft by these two motors.

FIGS. 14 through 17 are views showing several examples of tandem control systems based on conventional digital servomechanisms. FIG. 14 shows a first example of the tandem control wherein a movable member is linearly moved. More specifically, a pair of main motor 100 and sub motor 110 is provided to control the drive of a linearly movable rack 120 as a movable member. The main motor 100 transmits a driving force to the rack 120 via a speed reduction device 101 and a pinion 102. Also, the sub motor 110 transmits another driving force to the rack 120 via another speed reduction device 111 and another pinion 112.

FIG. 15 shows a second example of the tandem control system wherein a movable member is rotated. More specifically, a pair of main motor 100 and sub motor 110 is provided to control the rotational movement of a rotary rack 120 as a movable member. Transmission of driving forces from respective motors is made via speed reduction devices 101, 111 and pinions 102, 112 in the same manner as the first example of the tandem control system.

FIG. 16 shows a third example of the tandem control system designed for linearly moving the movable member, wherein the drive of the movable member 121 is controlled by two motors, namely the main motor 100 and sub motor 110 through two screw members 103 and 113 connected to the main motor and the sub motor respectively. The movable member 121 engages with both the two screw members 103 and 113, whose one ends are fixed to the fixing member 122, in order to have its drive controlled through the screw members 103 and 113 which are respectively driven by the two motors.

Furthermore, FIG. 17 shows a fourth example of the tandem control system designed for linearly moving, wherein a movable member 123 is driven by main motor 100 and sub motor 110 via a screw member 104 whose ends are connected respectively to the main motor 100 and the sub motor 110.

FIG. 18 is a block diagram showing a circuit arrangement for performing a tandem control based on a conventional digital servomechanism. The control blocks shown in FIG. 18 constitute a circuit for controlling a machine table 12 by a numerical control unit 1. A main servo motor 6 and a sub servo motor 7 are both connected to the machine table 12 via transmission mechanisms 10 and 10, respectively. Each of servo motors 6 and 7 is driven by a command signal sent from a servo amplifier 4 which is controlled by a current command sent from a digital servo control unit 3. Position feedback Mfb and Sfb (Mfb represents a position feedback of the main servo motor 6, while Sfb represents a position feedback of the sub servo motor 7) and speed feedback Vf1 and Vf2 (Vf1 represents a speed feedback of the main servo motor, while Vf2 represents a speed feedback of the sub servo motor) from servo motors 6 and 7 to the digital servo control unit 3 are made through detectors 8 and 9. For current feedback, current is fed back from each of servo amplifiers 4 and 5 to the digital servo control unit 3. Furthermore, a machine position feedback amount Tfb is fed back from the machine table 12 to the digital servo control unit 3 through a detector 13.

Furthermore, the numerical control unit 1 is connected to the digital servo control unit 3 via a shared RAM 2, to share the data between them.

Moreover, FIG. 19 is a block diagram showing a principal part of the control blocks for performing the tandem control based on a conventional digital servomechanism. In the principal-part block diagram of FIG. 19, two motors (a main motor and a sub motor) not shown are driven respectively by a main current command and a sub current command sent from the current control sections 17 and 18.

A position deviation "e", which is a difference between a position command "r" and an actual position "p", is multiplied by a coefficient "Kp" of a position gain 14 to obtain a speed command Vc. A speed control section 16 obtains a torque command Tc by an ordinary PI control or the like based on a speed deviation which is a difference between the speed command "Vc" and a speed feedback of the motor.

The torque command Tc is then added to a pre-load torque Tp1 to obtain a torque command Tc1, which is entered into a current control section 17 of the main motor, thereby controlling the main motor. On the other hand, the torque command Tc is added to a pre-load torque Tp2 and a resultant value is entered into an inversion device 19 to obtain a torque command Tc2. Thus obtained torque command Tc2 is entered into a current control section 18 of the sub motor to control the sub motor. The inversion device 19 is a control section for inverting the sign of signal in accordance with rotational directions of the main motor and the sub motor. More specifically, the inversion device 19 will not change the sign of signal when the rotational direction of the main motor is identical with that of the sub motor, while it will change the sign when the rotational direction of the main motor is different from that of the sub motor.

Each of the current control sections 17 and 18 receives a current feedback fb to independently perform the current control. The pre-load torque Tp1 and preload torque Tp2 are torque values required to add a predetermined offset to the torque command Tc calculated in the speed control section 16 in order to cause the main motor and the sub motor to rotate against each other. More specifically, the signs of both torques Tp1 and Tp2 are opposite to each other when the two motors rotate in the same direction, while they are same when the rotational directions of these two motors are different from each other.

Furthermore, the actual position "p" used for obtaining the position deviation "e" is either a position feedback pulse of the machine or a position feedback pulse of the motor obtainable via a switching device 20. The switching device 20 is capable of selectively inputting a machine position feedback pulse Tfb or a motor position feedback pulse Mfb.

According to the above-described conventional tandem controls based on the conventional digital servomechanisms, the position control and speed control are performed only as to the main motor, while the current control is executed independently as to each motor. In such a conventional control method, when the main motor has to produce a large torque in order to counter a large backlash, the movable part will run against the other object at a high speed, since the speed of the sub motor is not controlled, thereby adversely affecting the stability of the system.

Hence, there is provided a speed feedback averaging device 22 shown in FIG. 19 as a means for solving such a problem. This speed feedback averaging device 22 inputs the main motor speed feedback Vf1 and sub motor speed feedback Vf2 through the inversion device 19 and averages the inputted values to obtain the motor speed feedback. Thus, the speed of the sub motor is suppressed based on the obtained motor speed feedback amount, thereby improving the stability.

FIG. 20 illustrates an operation of a tandem control. FIGS. 20(a) through 20(e) sequentially illustrate the change in positional relationship between each axis and a movable member and the torque commands. More specifically, these diagrams illustrate the stages, wherein table acting as the movable member is accelerated (FIG. 20(b)) from the stationary condition (FIG. 20(a)) to a constant speed (FIG. 20(c)), decelerated (FIG. 20(d)) and finally stopped (FIG. 20(e)).

As explained in FIG. 19, opposing pre-load torques are added to the torque command Tc calculated in the speed control section so that the resultant torques can be applied to main axis 105 and sub axis 115 respectively. More specifically, the torque command Tc1 for the main axis is given as Tc1=Tc+Tp1, and the torque command Tc2 for the sub axis is given as Tc2=Tc+Tp2. The pre-load torque has to be large enough for overcoming the friction.

At the stationary condition of FIG. 20(a), the torque command Tc from the speed control section is substantially zero. Therefore, only the pre-load torques are applied to respective motors which thus maintain a stationary condition by being counterbalanced with the pre-load torques acting in the opposite directions as indicated by arrows. At the accelerating condition of FIG. 20(b), the speed control section gives a large drive torque to each motor in the same direction as the moving direction of a movable member as indicated by longer arrows. Therefore, the sub axis 115 receives a torque resulting from a summation of the drive torque and the pre-load torque (i.e. Tc+Tp2). In this case, |Tc|>|Tp2|, and the directions of these torques are opposite, and so the resultant torque acting on the sub axis has the same direction as the direction of movement. Hence, the sub axis moves in the opposite direction against the direction of pre-load torque, sharing a torque required for acceleration with the main axis 105.

At the constant-speed condition of FIG. 20(c), the drive torque required to move the table at a constant speed is not more than that required for just canceling a frictional force as shown by shorter arrows, or |Tc|<|Tp2|. In addition, the directions of the torques are opposite. Therefore, the sub axis 115 receives a torque acting in the direction opposite to the moving direction of the table and therefore moves in the opposite direction at a constant speed, counterbalancing with the direction of movement of the main axis 105.

At the decelerating condition of FIG. 20(d), a large drive torque is generated for each of the axes in the direction opposite to that of FIG. 20(b). Thus, the main axis 105 moves in the opposite direction, receiving a part of the torque required for deceleration. Furthermore, at the stop condition of FIG. 20(e), the main axis 105 and the sub axis 115 are applied only with the mutually opposing pre-load torques in the same manner as in FIG. 20(a); therefore, a stationary condition is maintained by the counterbalance between the opposite pre-load torques.

However, the above-described tandem control based on the conventional digital servomechanisms has the following problems.

(1) When motors and a machine are connected through a transmission mechanism having a low rigidity, such as a spring, the resonance frequency of such a transmission mechanism would be, for example, somewhere in a low frequency zone ranging from several Hz to several tens Hz. In such a case, the problem will be that if the main motor and the sub motor are driven by the tandem control, because they will vibrate in the opposite directions, causing the system to become unstable.

FIGS. 21(a) and 21(b) show the simulation results of the conventional tandem control. FIG. 21(a) and 21(b) show the variations of speeds of the main motor and the sub motor in response to a positive step command and a negative step command, respectively, wherein the main motor speed is indicated by a solid line and the sub motor speed is indicated by a dashed line.

(2) When a large torque is required for acceleration or deceleration like the cases of FIG. 20(b) and (d), small opposite pre-load torques are not good enough to keep the main axis and the sub axis counterbalanced with each other, since inadequate opposite pre-load torques will cause the moving member to be shifted closer to one of the two axes, thereby giving rise to a problem that the system will become unstable to prevent the backlash.

(3) It may be possible to solve the problem described in above (2) by adding a means for suppressing the influence of backlash, such as a clamp device capable of generating torques in opposite directions so as to always maintain a counterbalanced condition. However, according to the tandem control method utilizing this kind of clamp device, there is a problem that the system will become unstable when the drive operation has to be performed mainly by the sub motor.

FIG. 8 illustrates the torque commands where the clamp device is provided. In the case of FIG. 8(a) where the main motor is chiefly driven to apply a drive torque on the main axis for pulling the movable member, the control will be carried out without causing any detection lag since the positional detection is made by where the main motor. On the other hand, in the case of FIG. 8(b) where the sub motor is chiefly driven to apply a drive torque to the sub axis side for pulling the movable member, a detection lag will occur, causing the system to become unstable, because a position feedback pulse for the position control is detected by the main motor side and the speed command as an input to the speed control section for calculating the torque command is not generated by the sub motor side which generates an actual torque.

DISCLOSURE OF INVENTION

A first object of the present invention is to provide a tandem control method using a digital servomechanism capable of suppressing vibration in the transmission mechanism by solving the above-described conventional problems, as well as new problems arising incidental to the means for solving those old problems. A second object of the present invention is to provide a tandem control method for suppressing occurrence of backlash even when a large torque is applied. Furthermore, a third object of the present invention is to provide a tandem control method capable of realizing a stable control even in the driving operation in which the sub motor side is chiefly driven.

A first invention of this application is a control method for driving one axis using two servo motors, namely, a main motor and a sub motor. This control method is a tandem control method, wherein position control is executed by the main motor while current control is executed by both the main and sub motors; speed difference between the main motor and the sub motor is calculated; and a value for correction of torque is obtained based on the speed difference thus calculated; and this value for correction of torque is added to respective torque commands of both the main and the sub motors, thereby accomplishing the first object of the present invention.

The tandem control method of the present invention is a control method for driving a common movable member by the main motor and sub motor. The first invention is a case where the position control is made by the main motor, and the current control by both the main motor and the sub motor. Furthermore, in the first invention, the speed difference between the main motor and the sub motor is multiplied by a damping coefficient, and the damping coefficient is adjusted to obtain the value for correction of torque. With the adjustment of this damping coefficient, it becomes possible to adjust the gain of the torque for correction.

Furthermore, in the first invention, the speed difference between the main motor and the sub motor is multiplied by a transfer function for phase adjustment, and a primary coefficient of the transfer function is adjusted to obtain the value for correction of torque for suppressing vibrations in the transmission mechanism. With the adjustment of this primary coefficient, it becomes possible to adjust the phase of the torque for correction.

Still further, in the first invention, the value for correction of torque for suppressing vibrations in the transmission mechanism can be obtained by multiplying the speed difference between the main motor and the sub motor by the damping coefficient and the transfer function for phase adjustment, and by adjusting both the damping coefficient and the primary coefficient of the transfer function. Both the gain and phase of the torque for correction are adjusted by adjusting the damping coefficient and the primary coefficient.

A second invention of this application is a control method for driving one axis using two servo motors, namely, a main motor and a sub motor. This control method is a tandem control method wherein position control is executed by the main motor while current control is executed by both of the main and sub motors. In this method, a sign of a torque command generated from a speed control section is detected; a positive or negative torque command is suppressed in accordance with the detected sign; a current control section of each motor is always supplied with a one-directional torque command whose direction differs from the direction of one-directional command of the other motor, thereby accomplishing the object of the second invention.

In the second invention, the torque command is suppressed by outputting the torque command directly when it corresponds to a positive direction of each motor, and by clamping the torque command to zero when it corresponds to a negative direction.

A third invention of this application is a control method for driving one axis using two servo motors, namely, a main motor and a sub motor. This control method is a tandem control method wherein current control is executed by both the main and sub motors, and position control is executed by either the main motor or the sub motor when it corresponds to a move command being a difference of position commands, or a torque command being an output of a speed control section, thereby accomplishing the object of the third invention.

Also, in the third invention, the main motor executes the position control when the move command is for a positive direction, while the sub motor executes the position control when the move command is for a negative direction. Furthermore, in the third invention, the main motor executes the position control when the torque command is for a positive direction, while the sub motor executes the position control when the torque command is for a negative direction.

Furthermore, in the third invention, the position control is executed by multiplying a difference between a speed command of the main motor and a speed command of the sub motor by a switching coefficient, adding the product to the speed command of the main motor to obtain a new speed command, and changing over the switching coefficient in accordance with the sign of the move command or the torque command, thereby performing the position control of the motor corresponding to the move command or torque command. Still further, the switching coefficient related with a time constant in order to gradually switch the position feedback.

According to the first invention of this application, the position control is executed by the main motor while the current control is executed by both the main and sub motors; the speed difference between the main motor and the sub motor is calculated; and the value for correction of torque is obtained based on the speed difference thus calculated. Then, this value for correction of torque is added to respective torque commands of both the main and the sub motors, thereby driving one axis by the tandem control using two servo motors, i.e., the main motor and sub motor. With this control method, the speed difference between the main and sub motor for the tandem control can be reduced, whereby it becomes possible to suppress vibrations in the system even when the motors and the machine are connected through a transmission mechanism having a low rigidity such as a spring system.

Furthermore, the value for correction of torque for suppressing vibrations of the transmission mechanism can be obtained in the following manner: the speed difference between the main motor and sub motor is multiplied by either the damping coefficient or the transfer function for phase adjustment, or by the both. And, the damping coefficient or the transfer function for phase adjustment, or both is or are adjusted to obtain a desirable output characteristics of the system. With this adjustment, it becomes possible to obtain an adequate gain or torque of the torque command, or both of them.

According to the second invention of this application, the position control is executed by the main motor while the current control is executed by both the main motor and sub motor; the sign of the torque command generated from the speed control section is detected; positive or negative torque command is suppressed depending on the detected sign; and the current control section of each motor is always supplied with a one-directional torque command whose direction differs from the direction of the same of the other motor, thereby driving one axis by the tandem control using two servo motors, i.e., the main motor and the sub motor. With this control method, the main motor and the sub motor are always brought into a counterbalanced condition, so that the occurrence of backlash can be suppressed even a large torque is applied.

Furthermore, torque command generated from the speed control section can be suppressed by directly outputting the torque command when it corresponds to a positive direction of each motor, while by clamping the torque command to zero when it corresponds to a negative direction.

According to the third invention of this application, the current control is executed by both of the main and sub motors, and the position control is executed by one motor corresponding to the move command, thereby driving one axis by the tandem control using two servo motors, i.e., the main motor and the sub motor. With this method, it becomes possible to stabilize the system even when the sub motor side is chiefly driven.

Alternatively, the position control is executed by the motor which corresponds to the torque command. By this control, it becomes possible to realize a stable control even in a decelerating condition. For example, the stable control is realized even in a condition such as the decelerating condition in which the sub motor side is chiefly driven, and even when the move command is a positive direction.

Moreover, according to this embodiment, the main motor executes the position control when the move command or the torque command is for a positive direction, while the sub motor executes the position control when the move command or the torque command is for a negative direction. The difference between the speed command of the main motor and the speed command of the sub motor is multiplied by the switching coefficient, and the product is added to the speed command of the main motor to obtain the new speed command. The switching coefficient is changed over in accordance with the sign of the move command or the torque command. With this control, it becomes possible to calculate the torque command based on a speed output of the sub motor side when it actually generates the torque, thereby eliminating adverse effect of detection lag on the stability. Still further, the switching coefficient for the position control is related with the time constant in order to gradually switch the position feedback. With the provision of this time constant, the mechanical shock can be prevented from occurring due to the difference between speed commands in the switching operation.

Where the move command is O, it can be arranged for the positioning to be always made by the main motor by setting so that the position control will be executed by the main motor previously without causing any problem relating to positional dislocation.

BRIEF DESCRIPTION OF DRAWINGS

FIGS. 2(a) through 2(c) are block diagrams showing transfer functions for phase adjustment employed in the first invention of this application;

FIGS. 4(a) through 4(c) are graphs showing frequency characteristics to various adjustment coefficients α in accordance with the first invention of this application;

FIGS. 5(a) and 5(b) are graphs showing simulation results in accordance with the first invention of this application;

FIGS. 9(a) and 9(b) are graphs showing simulation results in accordance with the second invention of this application;

FIG. 15 is a schematic view showing the second example of the tandem control wherein the movable member is rotated;

FIG. 16 is a schematic view showing the third example of the tandem control wherein the movable member is linearly moved;

FIG. 17 is a schematic view showing the fourth example of the tandem control wherein the movable member is linearly moved;

BEST MODE FOR CARRYING OUT THE INVENTION

Hereinafter, embodiments of the present invention will be explained in detail with reference to the accompanying drawings.

(Arrangement Applicable to the first Invention of the Application)

Figure 1:
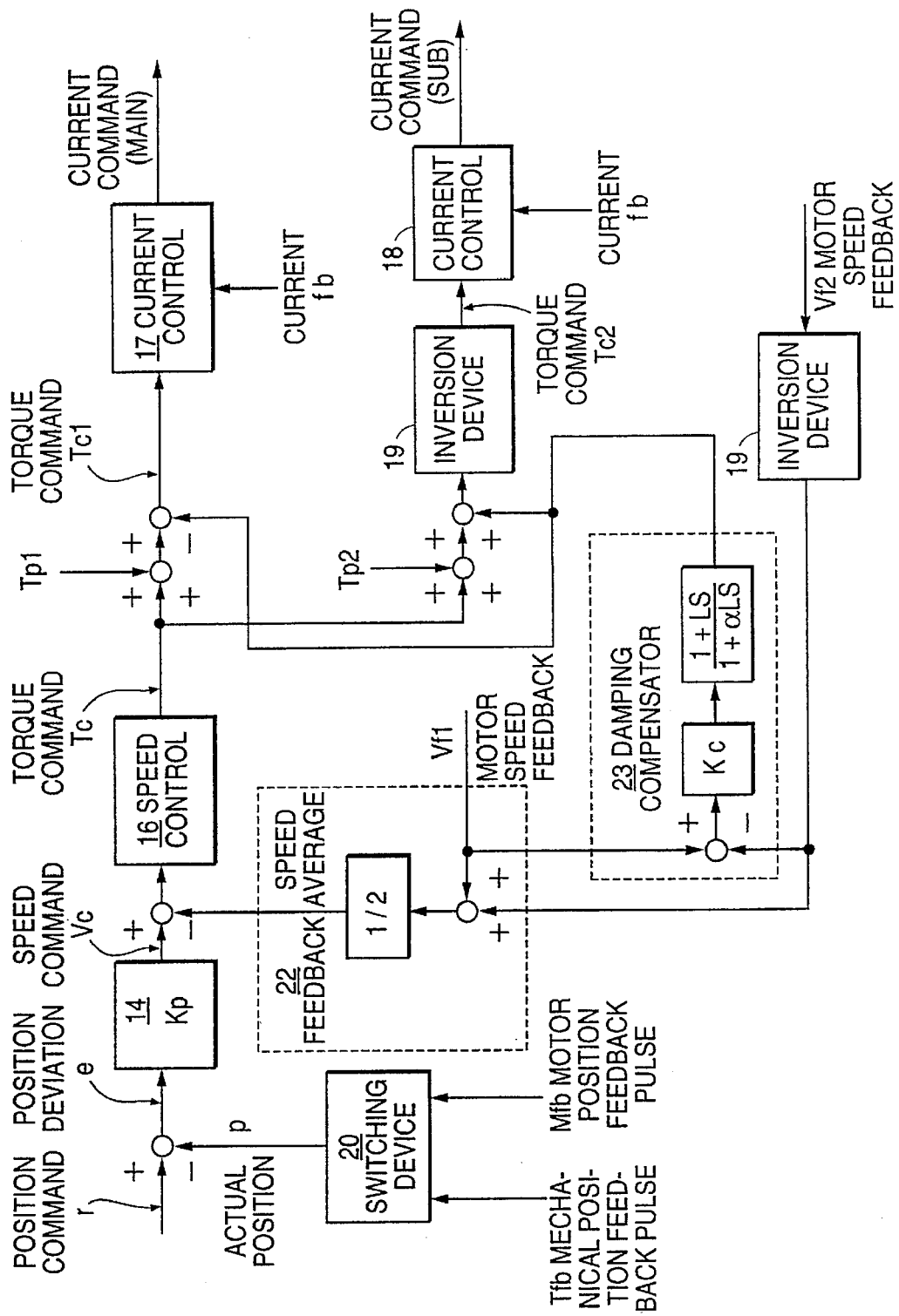
FIG. 1 is a circuit diagram showing an arrangement of control blocks in accordance with the first invention of this application.

First, the arrangement applicable as an embodiment of the first invention of this application will be explained. FIG. 1 is a circuit diagram showing the control blocks constituting an essential part of the arrangement of the first invention of this application.

Figure 19:
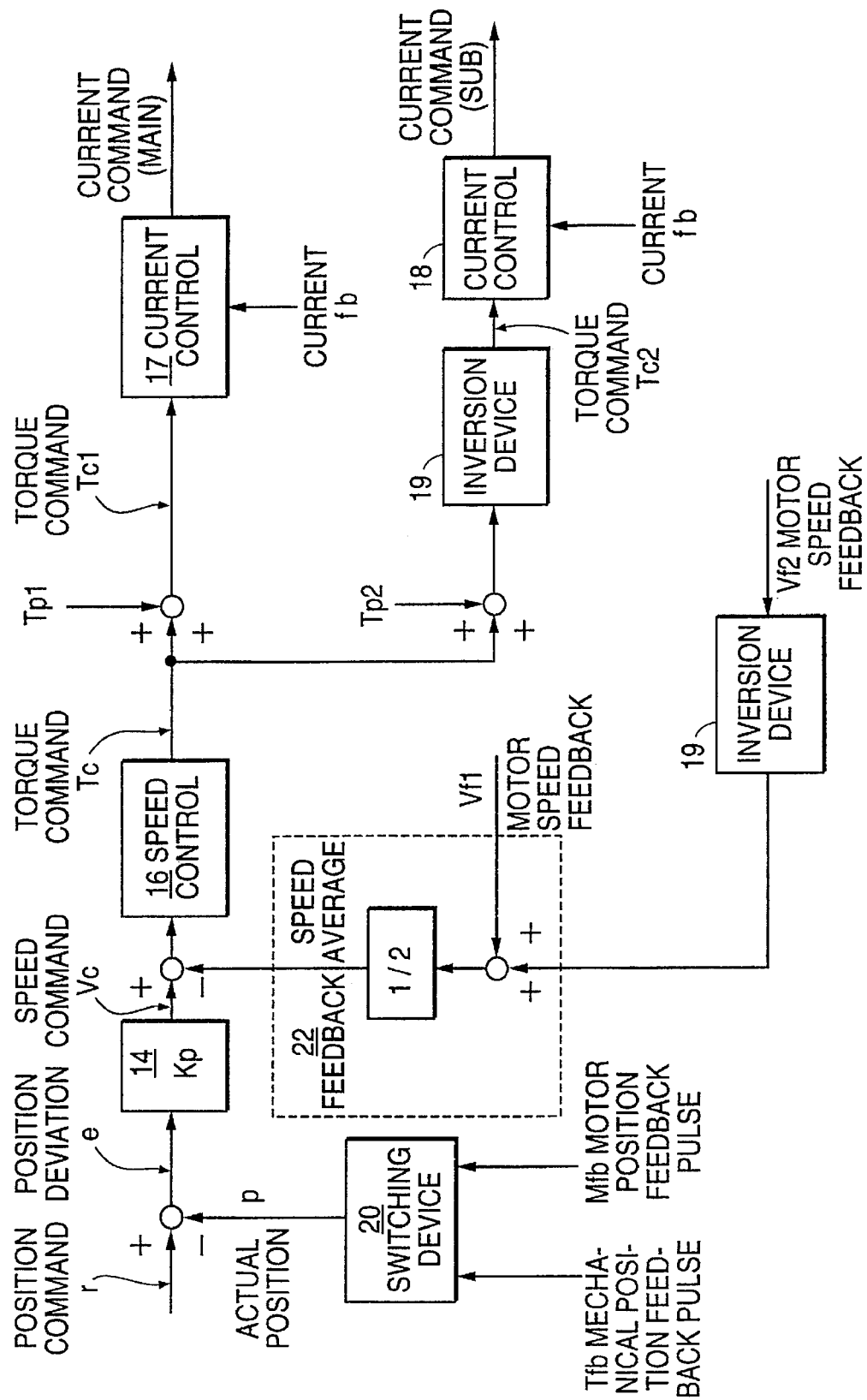
FIG. 19 is a circuit diagram showing an essential part of the arrangement of control blocks for the tandem control based on the conventional digital servomechanism.
Figure 20A:
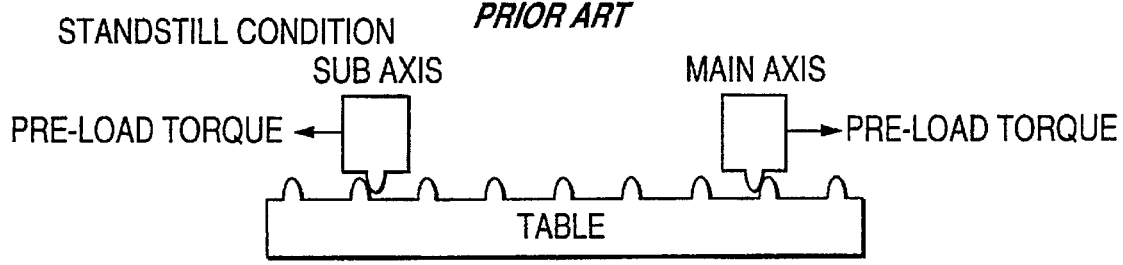
FIGS. 20(a) through 20(e) are views showing torque commands when the clamp device is provided.
Figure 20B:
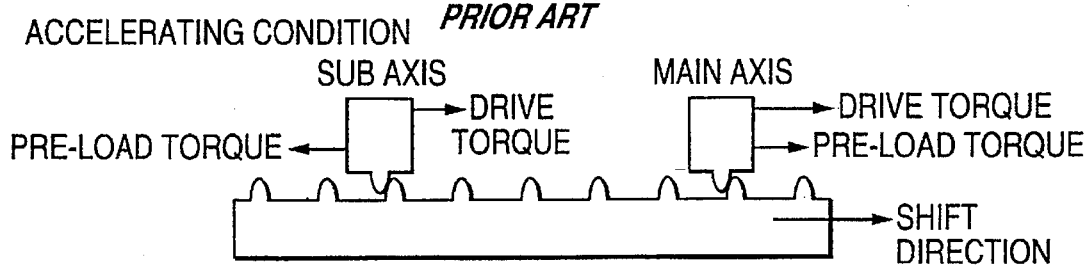
Figure 20C:
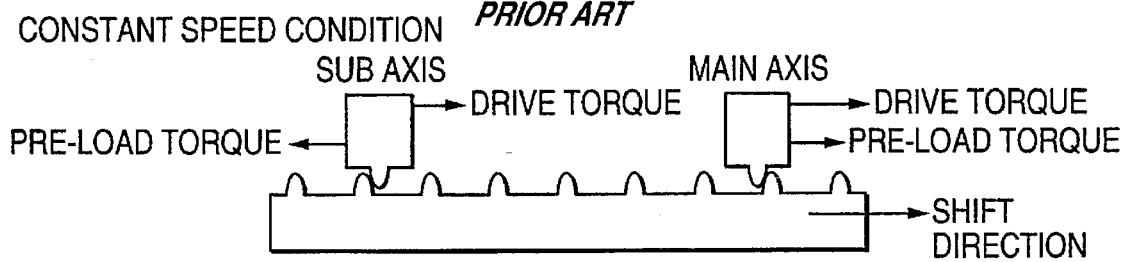
Figure 20D:
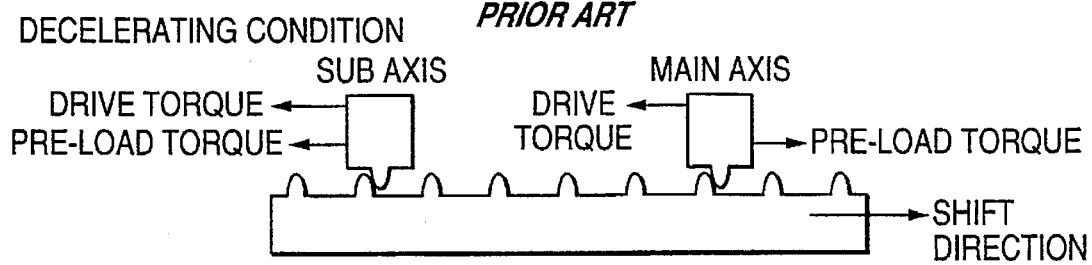
Figure 20E:
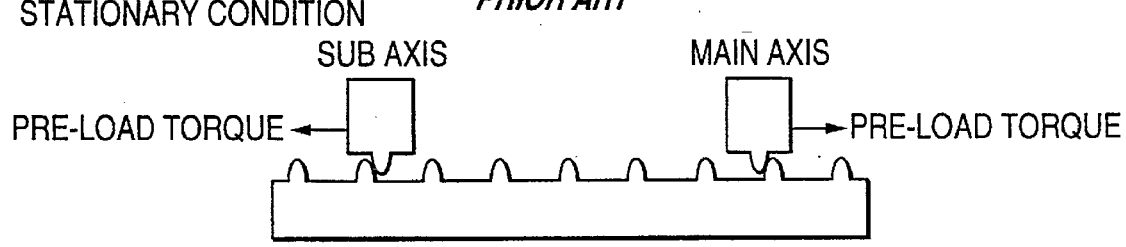
Figure 21A:
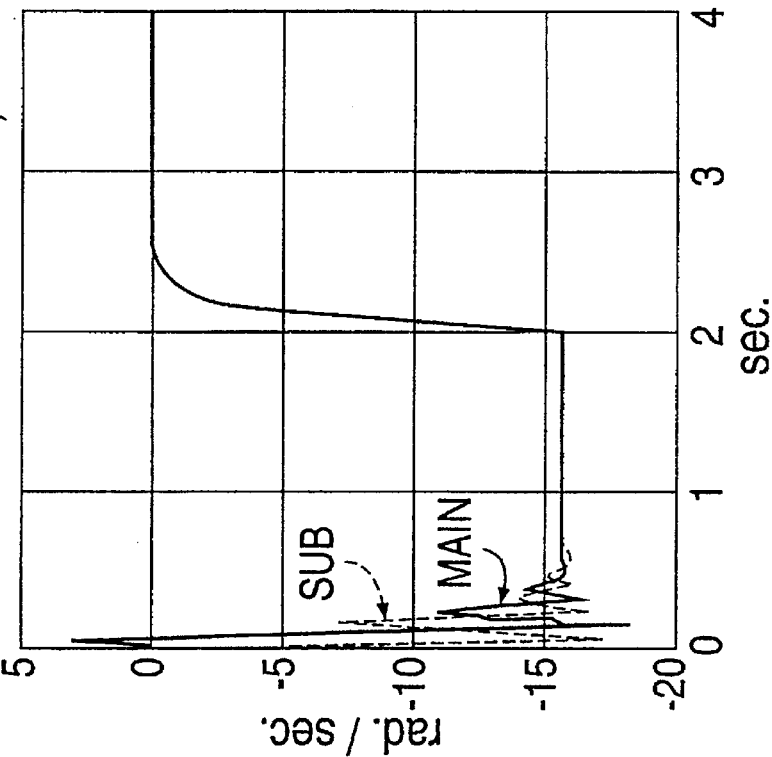
FIGS. 21(a) and 21(b) are graphs showing simulation results according to the conventional tandem control.
Figure 21B:
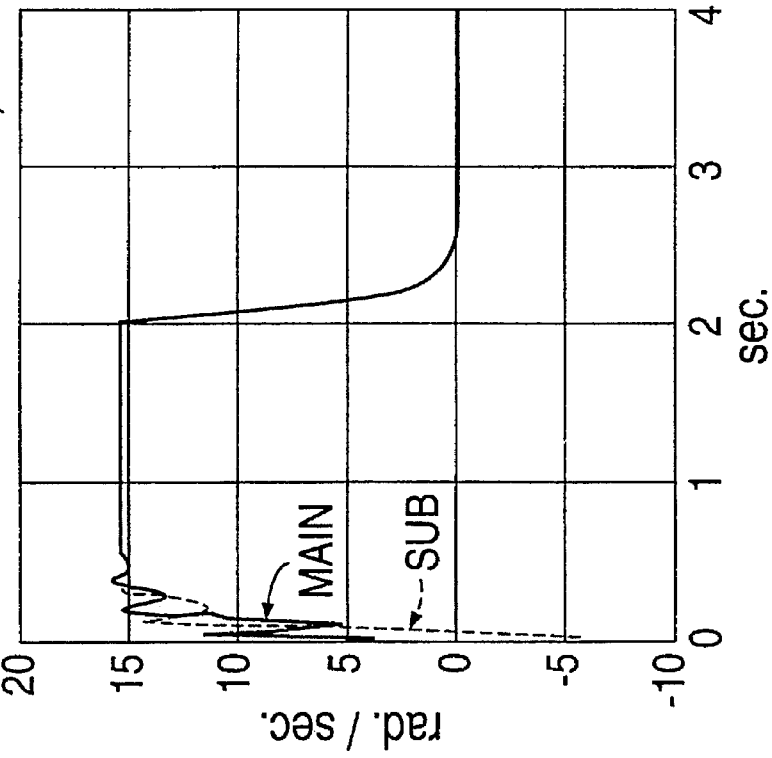

The block diagram of embodiment of FIG. 1 comprises control blocks substantially the same as those of the conventional circuit shown in FIG. 19 except a damping compensator 23. The damping compensator 23 calculates a speed difference between the main motor and the sub motor and obtains a value for correction of torque based on the obtained speed difference. The value for correction of torque is added to respective torque commands to both the main motor and the sub motor.

In the block diagram of the embodiment shown in FIG. 1, the current control sections 17 and 18 generate current commands to drive two motors (a main motor and a sub motor)(not shown).

A position deviation "e", which is a difference between a position command "r" and an actual position "p", is multiplied by a coefficient "Kp" of a position gain 14 to obtain a speed command Vc. Then, the speed deviation, the difference between the speed command Vc and the feedback of the motor speed, undergoes the control such as the ordinary PI control by the speed control section 16 to obtain a torque command Tc.

Of these two motors, the main motor is controlled by inputting a torque command Tc1 to the current control section 17 of the main motor, the torque command Tc1 being obtainable by adding a pre-load torque TP1 to a torque command Tc. On the other hand, a pre-load torque Tp2 is added to a torque command Tc, and a resultant value is entered into an inversion device 19 to obtain a torque command Tc2. Thus obtained torque command Tc2 is entered into a current control section 18 of the sub motor to control the sub motor. The inversion device 19 is a control section for inverting the sign of signal in accordance with rotational directions of the main motor and the sub motor. More specifically, the inversion device 19 will not change the sign of signal when the rotational direction of the main motor is identical with that of the sub motor, while it will change the sign when the rotational direction of the main motor is different from that of the sub motor.

Each of the current control sections 17 and 18 receives a current feedback fb to independently perform the current control. The pre-load torque Tp1 and Tp2 are torque values for adding predetermined offset to the torque command Tc, which is from the speed control section 16, in order to counterbalance the main motor and sub motor. More specifically, the signs of both pre-load torques Tp1 and Tp2 are opposite to each other when the two motors rotate in the same direction, while they are the same when the rotational directions of these two motors are different from each other.

Furthermore, the actual position "p" used for obtaining the positional deviation "e" is either a position feedback pulse from either the machine or the motor obtainable via a switching device 20. That is, the switching device 20 is capable of selectively inputting a machine position feedback pulse Tfb or a motor position feedback pulse Mfb.

A speed feedback averaging device 22 receives inputs of a main motor speed feedback Vf1 and an inverse value of a sub motor speed feedback Vf2, which have been inverted in the inversion device 19, and obtains an average of the inputs to obtain a feedback amount to the speed command Vc. Thus, the average of the main motor speed and sub motor speed is fed back as a speed feedback amount to suppress the speed of the sub motor, thereby improving the stability of the system.

According to the embodiment of the first invention, the position control is performed by the main motor while the current control is performed in each of the main and sub motors. Furthermore, speed control is carried out in such a manner that the speed difference between the main motor and the sub motor is reduced on the basis of the value for correction of torque obtained from the damping compensator 23. The damping compensator 23 may comprise a term of damping coefficient Kc and another term of transfer function. For example, this transfer function can be expressed by a formula $\{(1+LS)/(1+\alpha LS)\}$, where "L" represents a constant, "$\alpha$" represents an adjustment coefficient, and "S" represents a Laplace operator.

FIG. 2 is a block diagram showing transfer functions for phase adjustment in the discrete system when the sampling time is "Ts". And, this transfer function is expressed by a formula $\{(1+2L/Ts)+(1-2L/Ts)Z^{-1}/(1+2\alpha L/Ts)+(1-2\alpha L/Ts)Z^{-1}\}$. Assuming that $N_0=(1+2L/Ts)$, $N_1=(1-2L/Ts)$, $D_0=(1+2\alpha L/Ts)$ and $D_1=(1-2\alpha L/Ts)$, the transfer function can be expressed by a formula $\{(N_0+N_1 \cdot Z^{-1})/(D_0+D_1 \cdot Z^{-1})\}$.

Thus, in the torque correction, the gain can be adjusted by varying the value of damping coefficient Kc. Furthermore, it is possible to adjust the phase by the adjustment coefficient "$\alpha$". Also, "T" represents a coefficient for adjusting the peak of phase lead or phase lag.

The torque for correction obtained by the damping compensator 23 is subtracted from the torque command Tc1 to be supplied to the main motor, while it is added to the torque command Tc2 to be supplied to the sub motor. This sign relationship is based on the premise that the direction of the main motor side is a positive direction, whereby it becomes possible for the torque for correction to be applied in the direction in which the speed difference between the main motor and the sub motor can be reduced.

The above-described damping compensator 23 is used in a system including two terms, i.e., the term of damping coefficient Kc and the term of transfer function for phase adjustment; however, this damping compensator may be used in a system including only one of these terms. In such a case, the value or phase of the torque for correction will be corrected.

(Operation of the First Invention)

Figure 3:
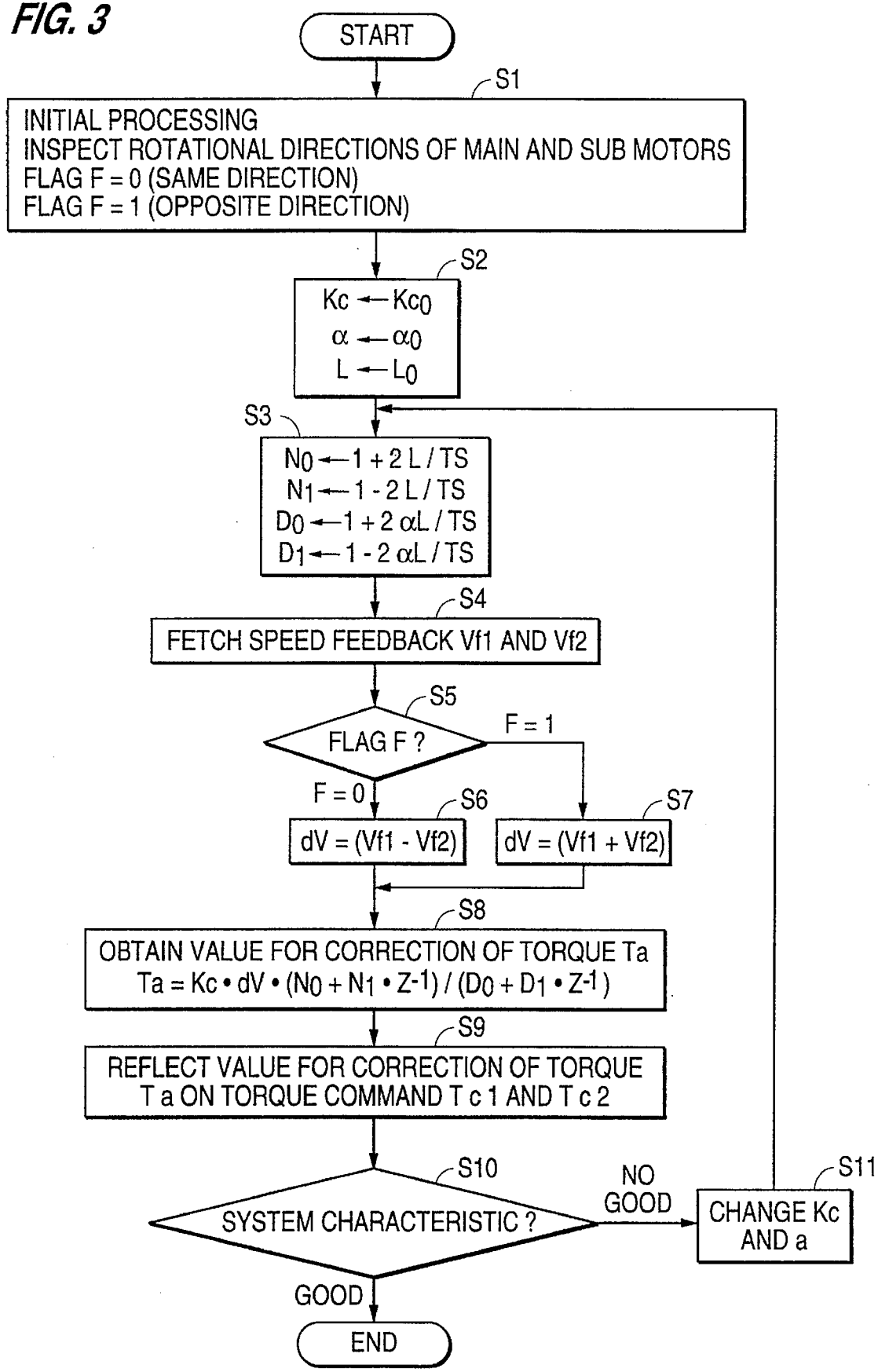
FIG. 3 is a flow chart showing an operation of the first invention of this application.

The operation of the first invention of this application will be explained with reference to FIG. 1 and the flow chart of FIG. 3. This explanation will cover a tandem control system for the two servo motors, i.e., the main motor and the sub motor, in which the speed difference between the main motor and the sub motor is calculated in order to obtain the torque for correction to be added to the torque commands for both the main motor and the sub motor, and also covers the case where both the maquitude and the phase of the damping are corrected.

First, for the tandem control of the main motor and the sub motor, a rotational direction of each motor is to be detected. When the rotational directions of two motors are identical, flag F is set to "0". On the other hand, the flag F is set to "1" when the rotational directions of two motors are different from each other (step S1). The inversion device 19 determines inversion or non-inversion of the sign with reference to the flag F. Succeeding the setting of flag F, the damping coefficient Kc of the damping compensator 23, and the adjustment coefficient $\alpha$ and the constant L for determining the primary coefficients of the transfer function for phase adjustment are set to their initial values $Kc_0$, $\alpha_0$ and $L_0$, thereby completing the initial setting.

Based on these values, $N_0=(1+2L/Ts)$, $N_1=(1-2L/Ts)$, $D_0=(1+2\alpha L/Ts)$ and $D_1=(1-2\alpha L/Ts)$ are calculated and are set (Step S2).

Next, speed feedback amounts Vf1 and Vf2 of the main and sub motors respectively are obtained by detecting their respective speeds, and obtained values are fetched (Step S4).

Next, it is judged whether the value of flag F inspected in the step S1 is "0" or "1". Then, the flow of control process proceeds to step S6 when the value of flag F is "0", or to step 7 when the value of flag F is "1", to obtain a difference between speed feedback amounts Vf1 and Vf2 of both motors (Step S5).

When the value of flag F is "0", the main motor and the sub motor rotate in the same direction. Thus, a difference between the speed feedback amounts Vf1 and Vf2 of two motors, i.e. (Vf1−Vf2), is calculated (Step S6). On the other hand, when the value of flag F is "1", the main motor and the sub motor rotate in the opposite directions. Hence, the inversion devices 19 provided on the side of the sub motor reverses the signs of the speed feedback and the torque command. Then, a difference between the speed feedback amounts Vf1 and Vf2 of two motors, i.e. (Vf1+Vf2) is calculated (Step S7). Hereinafter, the difference between the speed feedback amounts Vf1 and Vf2 of two motors is referred to as dV.

A torque for correction "Ta" is obtained based on the difference "dV" between the speed feedback amounts Vf1 and Vf2 of two motors (Step S8). The torque for correction "Ta" can be obtained by multiplying the difference "dV" between the speed feedback amounts Vf1 and Vf2 by the damping coefficient "Kc" and the transfer function $\{(N_0+N_1 \cdot Z^{-1})/(D_0+D_1 \cdot Z^{-1}\}$. In FIG. 1, as the speed feedback amount Vf2 of the sub motor is same direction as the speed of the main motor through inversion by the inversion device 19, the damping compensator 23 performs the subtraction.

The torque for correction "Ta" obtained in the step S8 is used to correct the torque commands Tc1 and Tc2, so that the speed control is executed based on the value for correction of torque commands (Step S9). Then, it is judged whether or not the characteristic of the system is improved by the speed control (Step S10). When the characteristic is not acceptable, the damping coefficient "Kc" and the adjustment coefficient "α" are varied (Step S11), and the above-described steps S4 through S10 are performed again.

As apparent from the transfer function $\{(1+2L/Ts)+(1-2L/Ts)Z^{-1}/(1+2\alpha L/Ts)+(1-2\alpha L/Ts)Z^{-1}\}$, the value of this transfer function becomes "1" when the adjustment coefficient "α" is "1", it shows that the phase will not change. FIG. 4 shows the frequency characteristic where the adjustment coefficient "α" is varied, and the constant "L" is 0.02, wherein FIGS. 4(a) through 4(c) show the cases of α=1, α=0.5 and α=0.2, respectively. As shown in these diagrams, a required phase adjustment can be made at a desired frequency by using the adjustment coefficient "α".

By repeating this process, it becomes possible to obtain the system capable of suppressing vibrations. In the processing of the above-described damping compensator, the processing of step S1 can be commonly used for the succeeding tandem controls once it has been set. Furthermore, the processings of steps S2 through S11 are executed every time an interrupt occurs in the tandem control.

FIGS. 5(a) and 5(b) show the simulation results of the first invention of this application when the damping coefficient "Kc" is 0.1, and no phase adjustment is executed.

(Arrangement and Operation applicable to the embodiment of the Second Invention)

Figure 6:
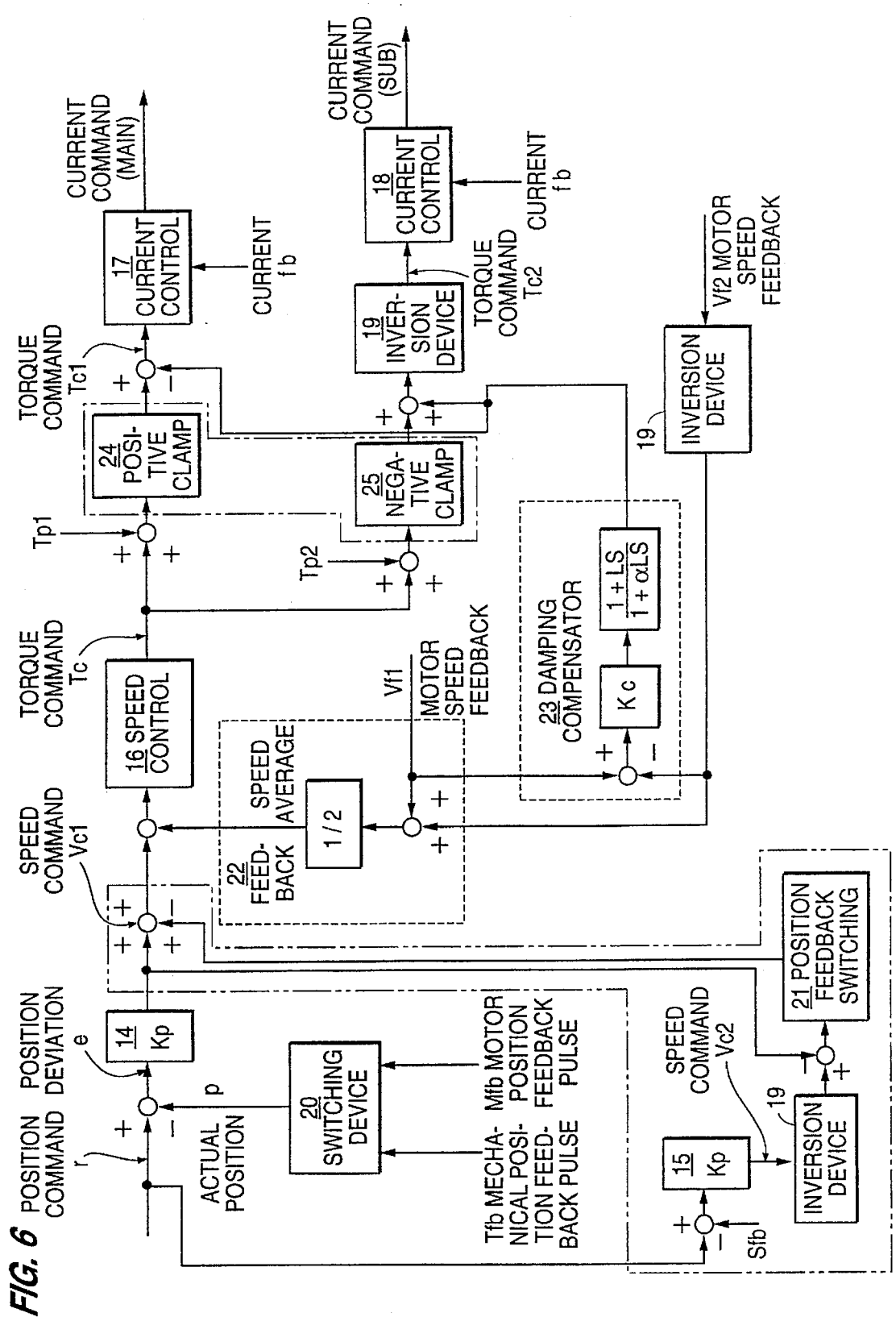
FIG. 6 is a circuit diagram showing an arrangement of control blocks in accordance with the second invention of this application.

Next, the arrangement and operation applicable to the embodiment of the second invention of this application will be explained. FIG. 6 is a block diagram showing the principal part of the control blocks illustrating the composition of the embodiment of the second invention of this application. In the block diagram shown in FIG. 6, the arrangement of the second invention of this application is encircled by chain line, and the arrangement of the third invention of this application is encircled by double-dashed chain line, Hereinafter, only the arrangement of the second invention encircled by the double-dashed chain line will be explained, and the explanation of the remaining arrangement will be omitted, since the explanation thereof is similar to that of the embodiment of the first invention.

The arrangement of the embodiment of the second invention is similar to the control blocks of the embodiment of the first invention shown in FIG. 1 except for the arrangement of clamp circuits 24 and 25 encircled by the single-dotted chain line. These clamp circuits 24 and 25 input the torque command which is a summation of the torque command Tc generated from the speed control section 16 and the pre-load torque Tp1 or Tp2, respectively. The clamp circuits 24 and 25 directly output the torque command when the torque command has a sign corresponding to the positive direction of the related motor, while they clamp the torque command to zero when the sign corresponds to the opposite direction.

As shown in FIG. 6, according to the embodiment of the second invention, the position control is carried out by the main motor while the current control is performed by both the main motor and the sub motor. In addition, the clamp circuits 24 and 25 adjust the torque commands Tc1 and Tc2 to be given to the respective current control sections 17 and 18 of the main and sub motors. With this arrangement, the tandem control of both the main and sub motors is carried out to drive one axis.

Figure 7A:
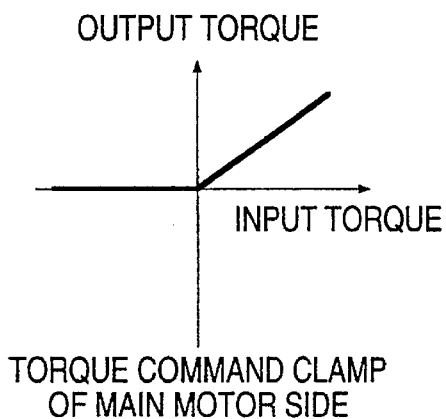
FIGS. 7(a) and 7(b) are graphs showing characteristics of a clamp circuit in accordance with the second invention of this application.

The clamp circuit 24 is a clamp circuit interposed between the speed control section 16 and the current control section 17 on the side of the main motor. FIG. 7(a) shows the characteristic of the clamp circuit 24. This clamp circuit 24 directly outputs the incoming torque command when its sign is positive corresponding to the positive direction of rotation of the main motor, while the incoming torque command is clamped to zero when its signal is negative. By the presence of this clamp circuit 24, the torque command Tc1 for the main motor can be controlled to generate a positive torque.

Figure 7B:
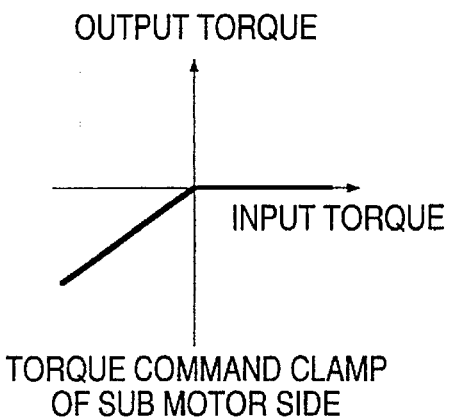

On the other hand, the clamp circuit 25 is a clamp circuit interposed between the speed control section 16 and the inversion circuit 19 on the sub motor side. FIG. 7(b) shows the characteristic of the clamp circuit 25. This clamp circuit 25 directly outputs the torque command when the incoming torque command has a negative sign corresponding to the positive direction of the sub motor, while it clamps the torque command to zero when the sign is a positive one corresponding to the opposite direction. By the presence of this clamp circuit 25, the torque command Tc2 for the sub motor can be controlled to generate a negative torque.

Thus, the clamp circuits 24 and 25 detect the sign of the torque command which is a summation of the torque command Tc generated from the speed control section 16 and the pre-load torque Tp1 or Tp2, suppresses the positive or negative torque command in accordance with the detected sign, and always supplies the current control section of each motor with a one-directional torque command differentiated between the main motor and the sub motor. With this arrangement, the tandem control of both the main and sub motors is carried out to drive one axis. Hence, the main motor and the sub motor are always kept in counterbalanced condition so that any backlash can be suppressed even when a large torque is applied.

Figure 8A:
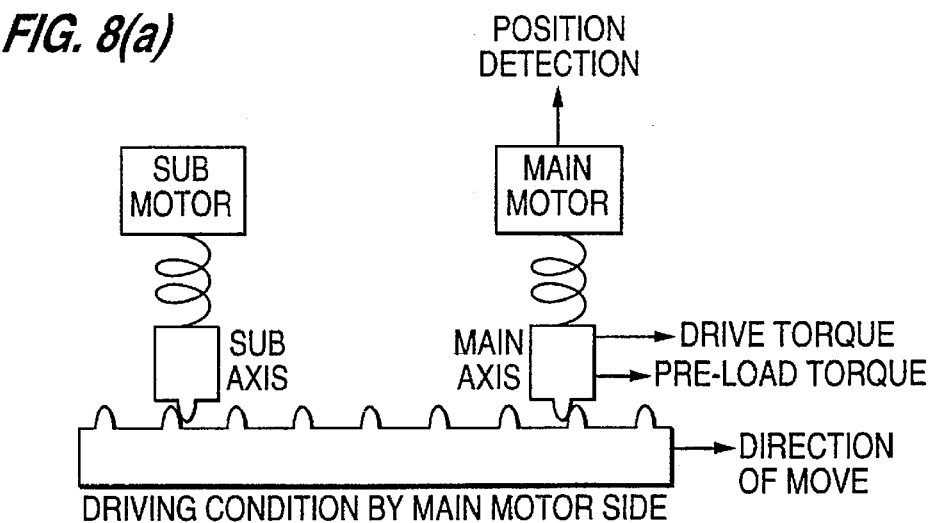
FIGS. 8(a) and 8(b) are diagrams illustrating torque commands when clamp devices are provided.
Figure 8B:
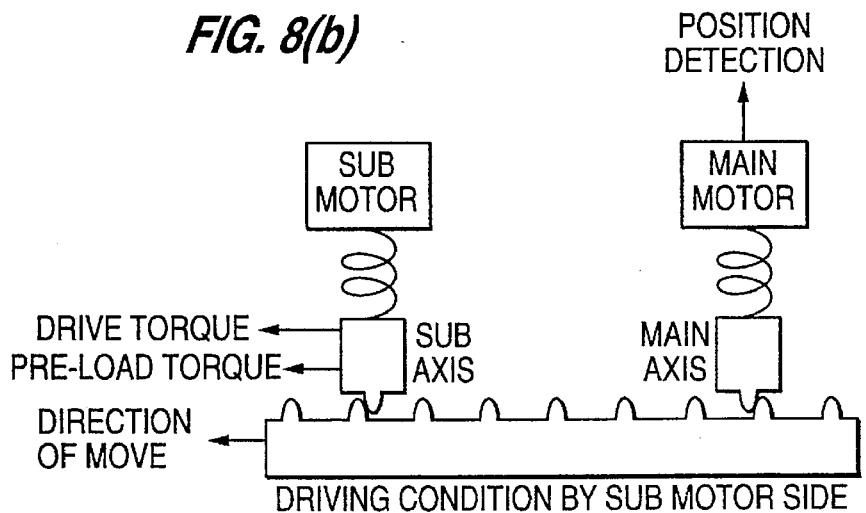

FIGS. 8(a) and 8(b) are views explaining torque commands under the condition where the clamp devices are provided. In the case of FIG. 8(a), the main motor is chiefly driven to apply a drive torque on the main axis side for a counterbalancing operation. In this case, the position detection is performed on the main motor side. Therefore, the control will be carried out without causing any detection lag, as shown in FIG. 9(a).

On the other hand, in the case of FIG. 8(b), the sub motor is chiefly driven to apply a drive torque on the sub axis side for a counterbalancing operation. In such a case, a position feedback pulse for the position control is detected on the main motor side. And, the speed command serving as an input to the speed control section, which calculates the torque command, is not detected on the side of the sub motor, and this will cause the detection lag and the resulting instability of the system shown in FIG. 9(b).

(Arrangement and Operation applicable to the Embodiment of the Third Invention)

Next, the arrangement and operation applicable to the embodiment of the third invention of this application will be explained. The third invention eliminates any detection lag possibly occurring when the sub motor is chiefly driven.

The arrangement of main control blocks in accordance with the embodiment of the third invention of this application is disclosed in FIG. 6, wherein the arrangement of the embodiment of the third invention is encircled by double-dashed chain line. Hereinafter, only the part of composition other than the part of composition of the third invention encircled by the double-dotted chain line will be explained. Other arrangement is similar to that of the embodiment of the first invention and therefore the explanation thereof will be omitted.

The arrangement of the embodiment of the third invention is substantially similar to the control blocks of the embodiment of the second invention shown in FIG. 6 except for an arrangement for switching position feedback encircled by double-dotted chain line. The arrangement for the changeover of the position feedback includes obtaining the difference between the speed command to the main motor and the speed command to the sub motor, multiplying the speed command difference by the changeover coefficient, and adding the product to the speed command for the main motor to obtain a new speed command.

In FIG. 6, according to the embodiment of the third invention, the position control is carried out by the main motor while the current control is performed by both the main motor and the sub motor. In addition, either the main motor side or the sub motor side executes the position control in response to the move command. More specifically, the position control is executed by the main motor when the move command is of a positive direction, but is executed by the sub motor when the move command is of a negative direction. With this arrangement, the tandem control of both the main and sub motors is carried out to drive one axis. This embodiment applies to the case where the position control is executed by the motor on the side of the motor which responds to the move command; however, it is also easy to execute the position control by the motor in a position to respond the torque command.

The position feedback switching in accordance with the third invention includes obtaining a difference between the speed command Vc1 at the main motor side and the speed command Vc2 at the sub motor side, multiplying this difference with a switching coefficient "k", and adding the resultant value to the speed command Vc1 of the main motor side to produce a new speed command Vc. In the composition of FIG. 6, an output of the position gain 15 is entered into an inversion device 19 to obtain a speed command Vc2 of the sub motor side. Then, the speed command Vc1 of the main motor as an output of the position gain 14 is subtracted from the position gain Vc2. The result of the subtraction is multiplied by the changeover coefficient. The product is then subtracted from the speed command Vc1 to obtain the speed command VC.

The speed command Vc obtained according to the above-described arrangement is expressed by an equation Vc=Vc1+k·(Vc2−Vc1).

When the switching coefficient "k" is set to "0" for positive-direction drive of the main motor (i.e. in response to the move command having a positive direction), the speed command Vc becomes equal to the speed command Vc1 from the above equation, allowing the position control on the main motor side. On the contrary, when the switching coefficient "k" is set to "1" for negative-direction drive of the main motor (i.e. in response to the move command having a negative direction), the speed command Vc becomes equal to the speed command Vc2 from the above equation, allowing the position control on the sub motor side.

The above embodiment is designed so that the position feedback switching between the main motor side and the sub motor side can be made by setting the switching coefficient k to either 0 or 1. However, the embodiment can also be designed so that the switching of the position feedback can be made gradually according to the time constant τ where the switching coefficient can be expressed as k={1/(1+τs)}.

According to the above-described gradual switching of position feedback based on time constant "τ", it becomes possible to reduce a difference between speed commands caused due to the difference between position feedback amounts at the time of the changeover of the switching coefficient "k", producing an effect of reducing a mechanical shock occurring due to the difference between the speed commands.

Figure 10:
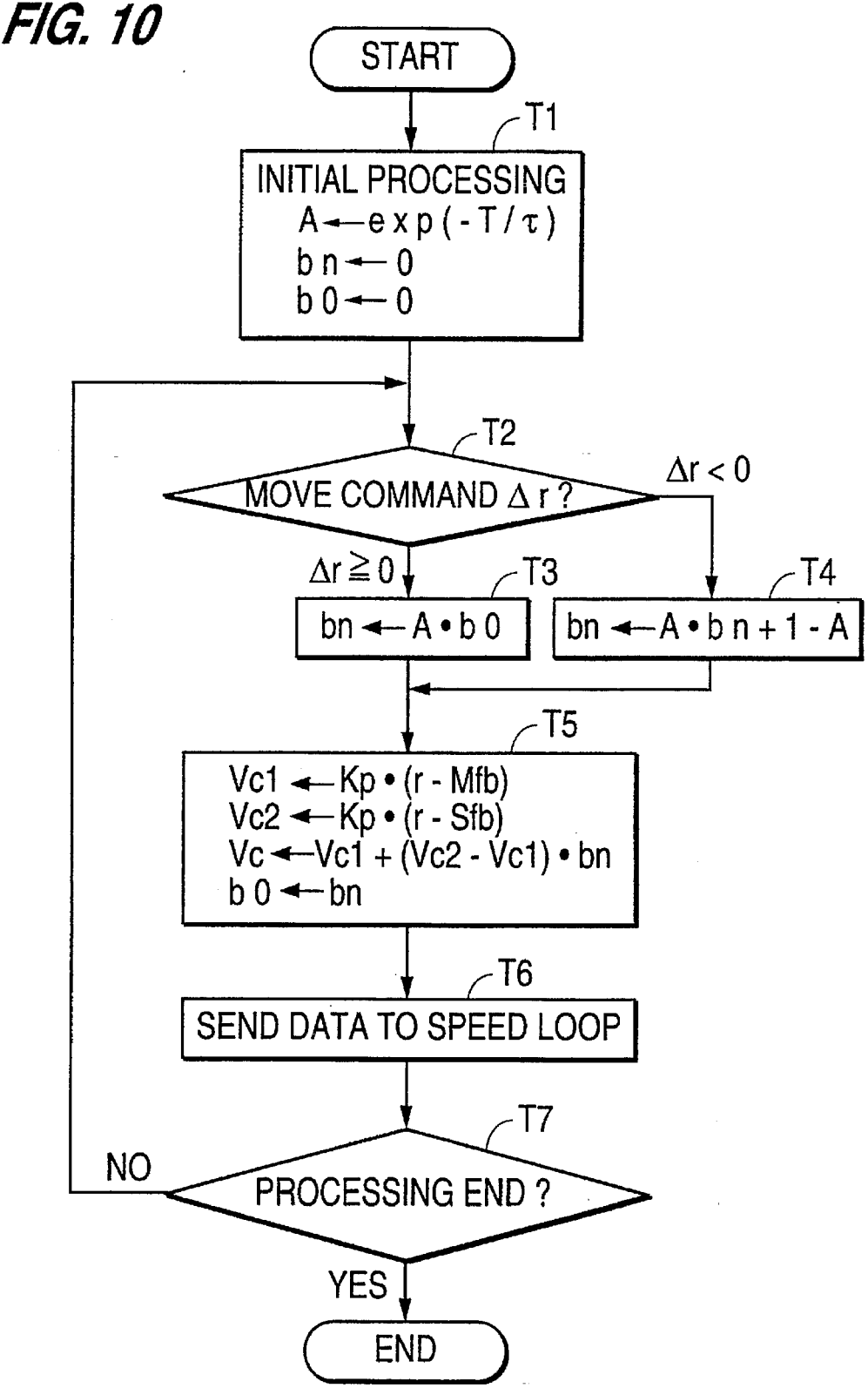
FIG. 10 is a flow chart showing an operation of a third invention of this application.

An operation of the third invention of this application will be explained with reference to the flow chart of FIG. 10. The explanation is limited to the switching of position feedback, which will be explained in accordance with numerals of step T in the flow of digital discrete processing.

In the switching of position feedback, the sequential switching coefficient k in the discrete system can be given by $$b(n)=A\cdot b(n-1)+(1-A)\cdot k(n)$$

where "b(n)" represents a sequential switching coefficient in the discrete system, "A" (=exp(−Ts/τ)) represents a change by the time constant "τ", and "Ts" represents a sampling time. Furthermore, k(n) is "0" when the move command is positive, and is "1" when the move command is negative. By using the above-described sequential switching coefficient b(n), it becomes possible to gradually switch the position feedback in accordance with the time constant "τ".

First, an initial processing is performed for starting the position control based on the position switching. In this initial processing, the change term "A" by the time constant "τ" and sequential switching coefficients b(n) and b0 used in the above-described equation are initialized (Step T1). After this processing, the sign of the move command Δr, which is a difference between position commands τ, is judged to determine whether the position feedback is to be made by the main motor or the sub motor (Step T2). More specifically, when the move command Δr is judged to have a positive sign in step T2, a processing for driving the main motor at a positive speed is executed at step T3. On the other hand, when the move command Δr has a negative sign, a processing for driving the main motor at a negative speed is executed at step T4.

In the step T3, the above-described equation is transferred to b(n)=A·b0 by replacing k(n) by "0". Furthermore, in the step T4, the above-described equation is transformed to b(n)=A·b0+1−A by replacing k(n) by "1".

Next, speed commands Vc1 and Vc2 are obtained. Then, the speed command Vc is obtained using the values of speed commands Vc1 and Vc2 and the sequential switching coefficient b(n) determined in the step T3 or T4. The speed commands Vc1 and Vc2 can be obtained by first subtracting the position feedback pulse Mfb from the position command r to obtain the difference (r−Mfb), and then multiplying the difference by the position gain Kp. Similarly, the position command "r" is subtracted by the position feedback pulse Sfb of the sub motor to obtain difference (r–Sfb), which is then multiplied by the position gain Kp, thereby obtaining the speed command Vc2.

To obtain the speed command Vc, the speed command Vc1 is subtracted from the speed command Vc2, the result is multiplied by the sequential switching coefficient b(n), and the speed command Vc1 is added to the product.

In this case, the value of the sequential switching coefficient b(n) is replaced by the initial value b0 of the sequential switching coefficient (Step T5).

Subsequently, the speed command Vc obtained in the step T5 is sent to the speed loop to perform the position control (Step T6).

Next, it is judged whether the position control by the position switching is to be terminated or not (Step T7). When the position control by the position switching is to be continued, the control procedure returns to the step T2 and repeats the steps T2 through T6.

By using the time constant, the switching can be made gradually to reduce the shock to the machine can be reduced even when the polarity of the move command is varied.

Figure 11A:
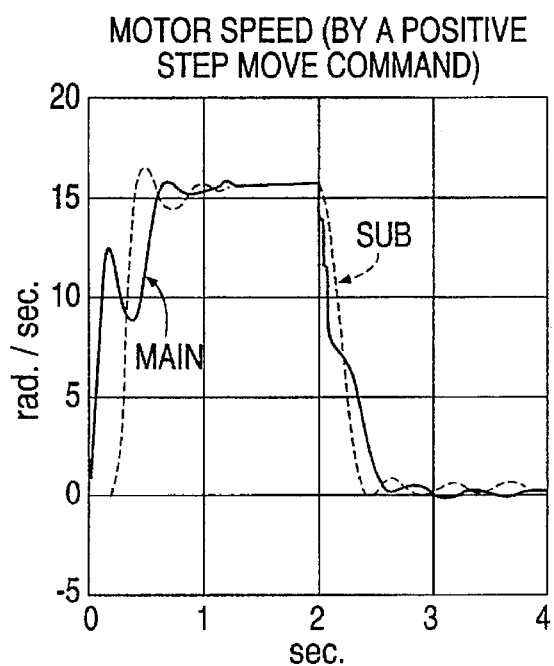
FIGS. 11(a) and 11(b) are graphs showing simulation results in accordance with the third invention of this application, wherein a time constant for position switching is "0"
Figure 11B:
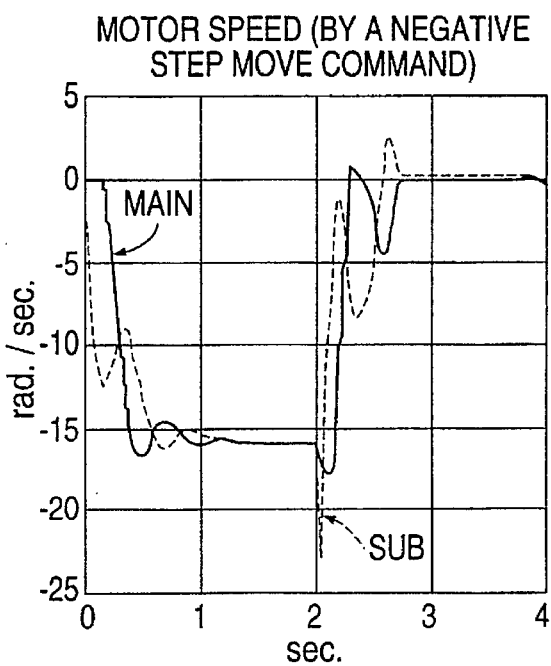
Figure 12A:
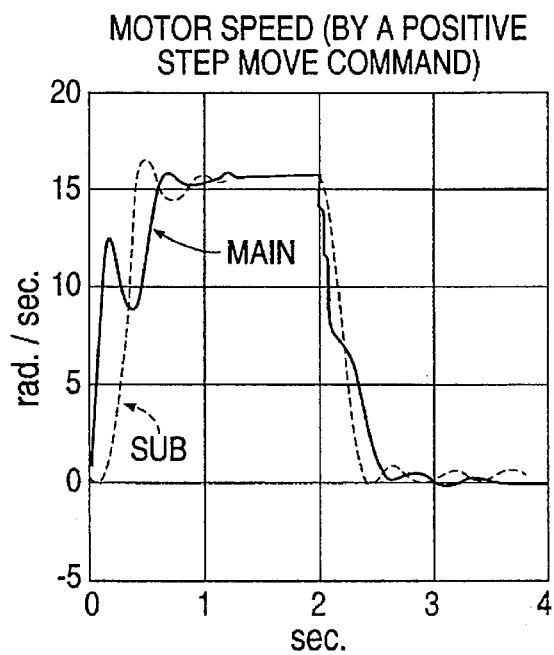
FIGS. 12(a) and 12(b) are graphs showing simulation results in accordance with the third invention of this application, wherein the time constant for position switching is "100 ms"
Figure 12B:
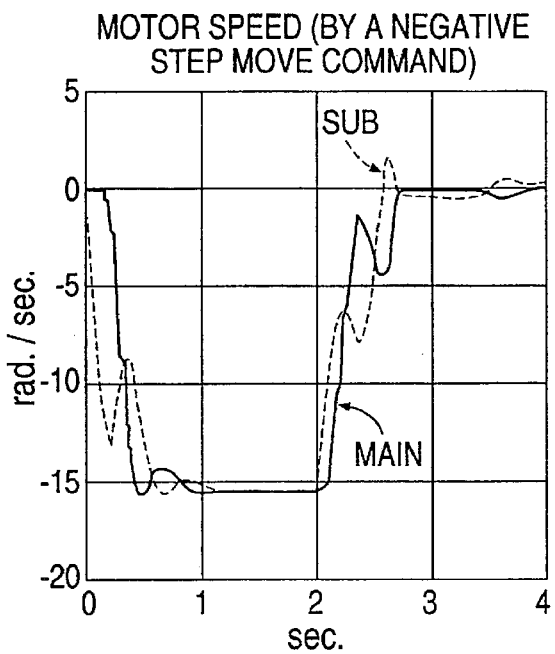
Figure 13A:
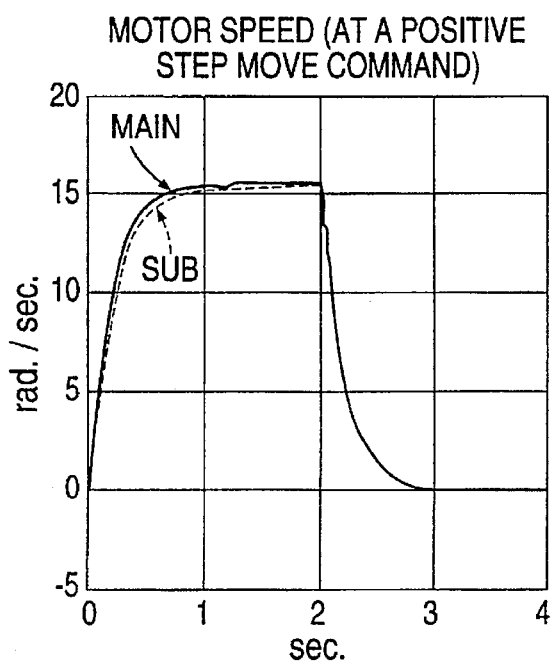
FIGS. 13(a) and 13(b) are graphs showing simulation results in accordance with the third invention of this application, wherein the time constant for position switching is "100 ms" and the damping compensation is made.
Figure 13B:
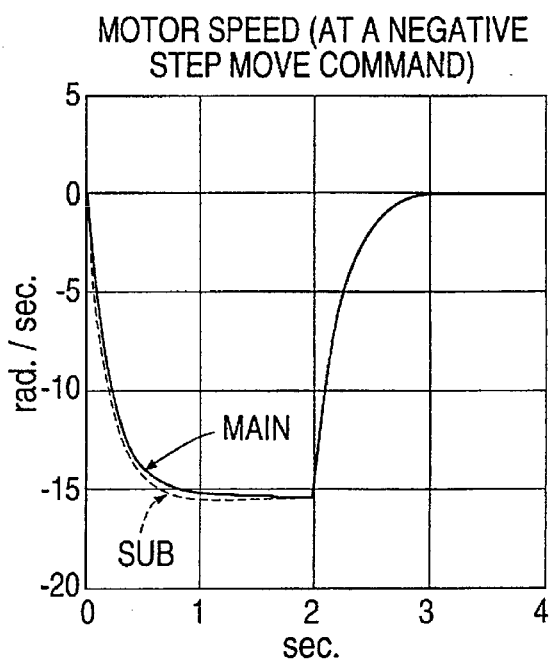
Figure 14:
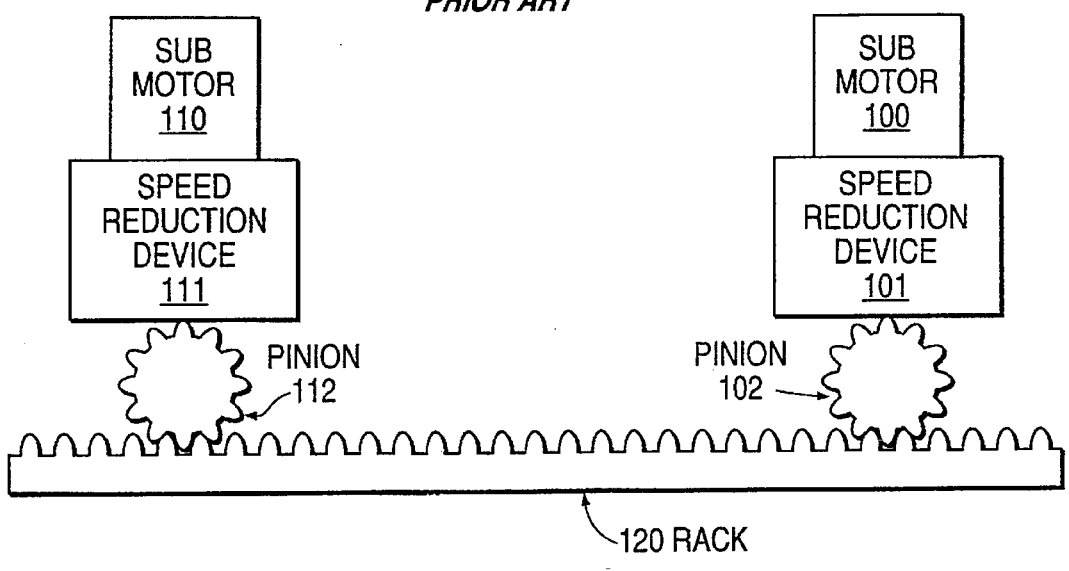
FIG. 14 is a schematic view showing the first example of the tandem control wherein the movable member is linearly moved.
Figure 18:
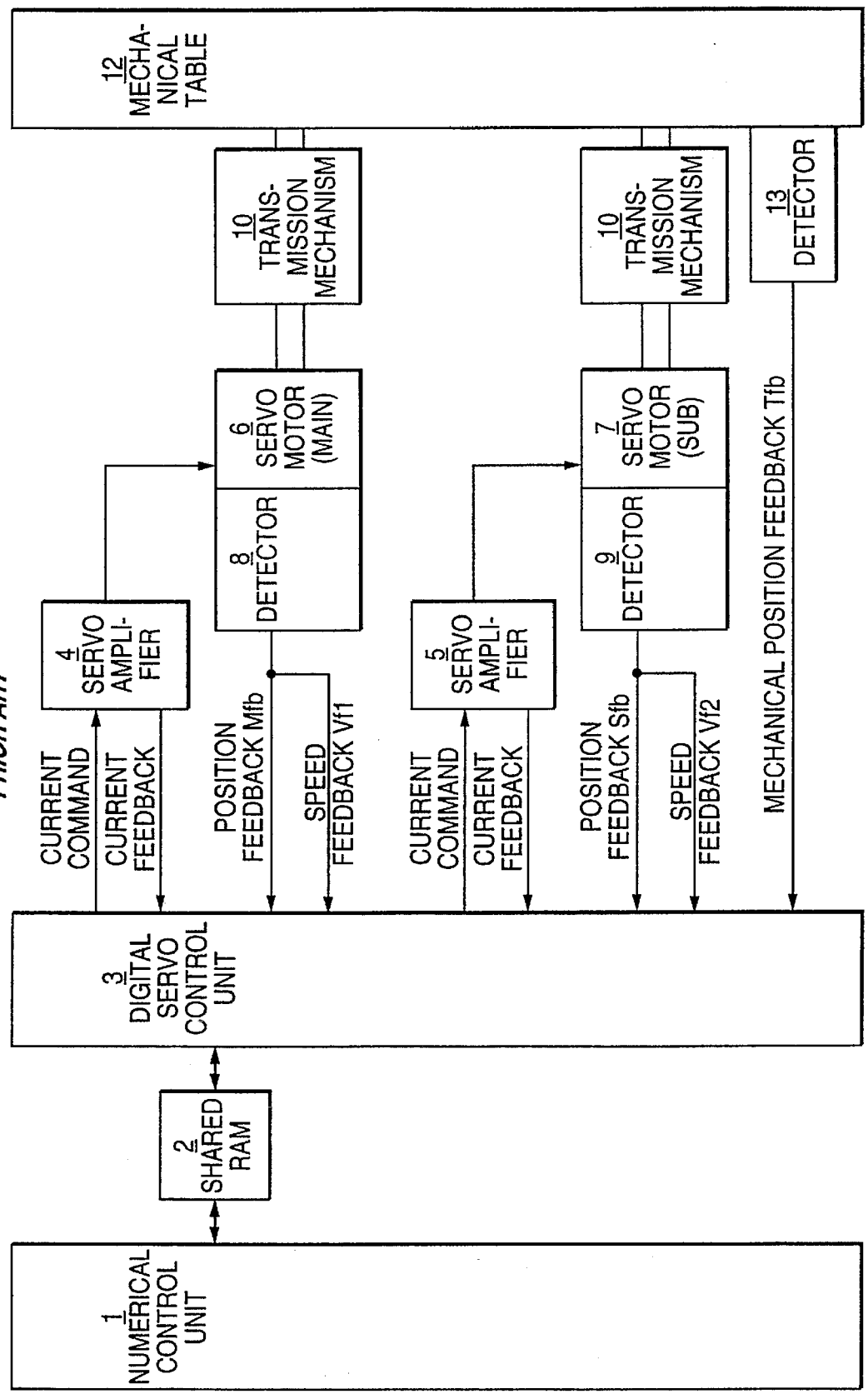
FIG. 18 is a circuit diagram showing an arrangement of control blocks for the tandem control based on a conventional digital servomechanism.

FIGS. 11(a) and 11(b) show simulation results in which the time constant for position switch is "0". FIGS. 12(a) and 12(b) show simulation results in which the time constant for position switch is "100 ms". FIGS. 13(a) and 13(b) show simulation results in which the time constant for position switch is "100 ms" and the damping compensation is performed.

As explained above, the first invention of this application provides a tandem control method based on a digital servo-mechanism capable of suppressing vibrations in the transmission mechanism. The second invention of this application provides a tandem control method capable of preventing the backlash even when the applied torque is considerably large. The third invention of this application provides a tandem control method capable of providing a stable control even during the driving operation wherein the sub motor side is chiefly driven.

I claim:

1. A tandem control method based on a digital servomechanism, comprising two servo motors, namely, a main motor and a sub motor, as a control method for driving one axis, wherein position control is executed by the main motor, while current control is executed by both the main motor and sub motor the method comprising steps of;

calculating the speed difference between the main motor and said sub motor;

obtaining a value for correction of torque based on said speed difference; and adding said value for correction of torque to respective torque commands of both the torque command for the main motor and the torque command for the sub motor.

2. The tandem control method in accordance with claim 1, wherein said speed difference between said main motor and said sub motor is multiplied by a damping coefficient, and said damping coefficient is adjusted to obtain said value for correction of torque.

3. The tandem control method based on a digital servomechanism in accordance with claim 1, wherein said speed difference between said main motor and said sub motor is multiplied by a transfer function for phase adjustment, and a primary coefficient of said transfer function is adjusted to obtain said value for correction of torque.

4. A tandem control method based on a digital servomechanism comprising two servo motors, namely, a main motor and a sub motor, as a control method for driving one axis, wherein position control is executed by the main motor while current control is executed by both the main motor and sub motor, the method comprising steps of:

detecting a sign of a torque command generated from a speed control section;

suppressing a positive or negative torque command in accordance with said sign; and each of current control sections of the main motor and sub motor is always supplied with one-direction torque command, the direction thereof differing from that of the other.

5. The tandem control method based on a digital servomechanism in accordance with claim 4, wherein said suppression of torque command is executed by clamping a one-directional torque command and a corresponding opposite torque command to zero.

6. A tandem control method based on a digital servomechanism comprising two servo motors, namely, a main motor and a sub motor, as a control method for driving one axis, wherein current control is executed by both the main and sub motors, and position control is executed by the motor corresponding to a move command being a difference of position commands, or the motor corresponding to a torque command being an output of a speed control section.

7. The tandem control method based on a digital servomechanism in accordance with claim 6, wherein the main motor executes the position control when the move command or the torque command is for a positive direction, while the sub motor executes the position control when the move command or the torque command is for a negative direction.

8. The tandem control method based on a digital servomechanism in accordance with claim 6, wherein said position control is executed by multiplying the difference between a speed command of the main motor and a speed command of the sub motor by switching coefficient; the product is added to the speed command of the main motor to obtain a new speed command; and said switching coefficient is changed in accordance with the sign of said move command or said torque command, thereby performing the position control by the motor corresponding to the move command.

9. The tandem control method based on a digital servomechanism in accordance with claim 8, wherein said switching coefficient has a time constant in order to gradually change a position feedback operation.

* * * * *